Nov. 19, 1935.  O. R. DOUTHETT  2,021,716
ARTIFICIALLY COLORED BUILDING MATERIAL
Original Filed March 2, 1931
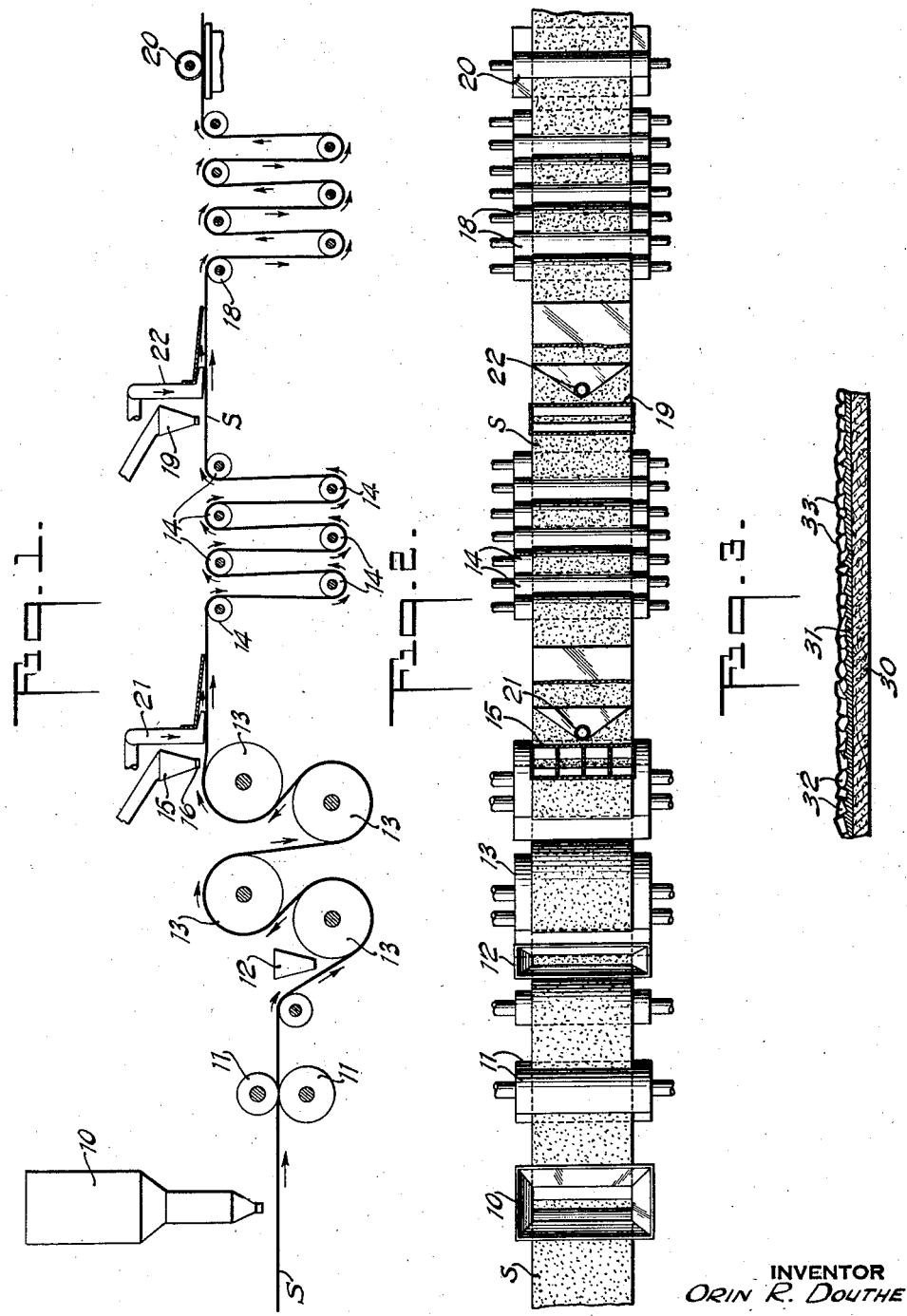
INVENTOR
ORIN R. DOUTHETT.
BY
Samuel Stearman
ATTORNEY Patented Nov. 19, 1935

2,021,716

UNITED STATES PATENT OFFICE 2,021,716

ARTIFICIALLY COLORED BUILDING MATERIAL

Orin R. Douthett, Perth Amboy, N. J., assignor to The Patent and Licensing Corporation, Boston, Mass., a corporation of Massachusetts Original application March 2, 1931, Serial No. 519,672, now Patent No. 1,970,953, dated August 21, 1934. Divided and this application August 8, 1934, Serial No. 738,910

4 Claims. (Cl. 108—7)

This invention relates to composition roofing or siding material surfaced with granules that are artificially colored and to a new method of producing the same.

This application is a division of my copending application Serial Number 519,672, filed March 2, 1931, now Patent No. 1,970,953, Aug. 21, 1934.

Composition roofing or siding material consists generally, of a felted fabric that is impregnated with a waterproofing saturant, such as, asphalt or similar bitumen and coated on one or both sides with a high melting point asphalt, such as, oxidized or blown asphalt so-called, in which is partially embedded a layer of surfacing material, such as, comminuted slate, slag or the like.

At the present time an important factor in the demand for and sales of composition roofing and siding material is the variety of colors in which it may be supplied. The natural crushed slates or other surfacing material occur in only certain colors or shades. Consequently, it has become necessary to artificially color the surfacing material in order to provide roofing or siding exhibiting the desired color or combination of colors.

A number of methods have heretofore been proposed for the production of composition roofing or siding material having artificially colored mineral granules thereon. According to certain of these methods the coloring process involves the treatment of mineral granules with a coloring agent and a silicate such as sodium silicate, the granules being subsequently subjected to kiln treatment at high temperatures, often exceeding 1500° F. Of course, the employment of these high temperatures limits the granules that may be employed to those of mineral composition and the range of colors and shades that may be produced because coloring media that are adversely affected by these high temperatures cannot be used.

Moreover in all of these processes it has been customary, first to color the granules artificially and then to partially embed the granules in a layer of asphalt.

When the granules are first artificially colored by certain processes involving the use of a potential fixing or binding agent such as sodium silicate and subsequently partially embedding the artificially colored granules in asphalt, a marked tendency of the asphalt to blister has been observed.

From what I have observed in the course of my experimentations directed towards the causes and prevention of asphalt blistering, I believe that the phenomenon of blistering bears a direct relation to the fixing or binding agent that surrounds the granules partially embedded in the asphalt. In practice, sodium silicate is the potential fixing agent most commonly employed to bind the coloring agent to the granule and/or protect it from the deleterious action of the weather. This particular potential fixing agent, (as well as others) when treated according to certain practices heretofore known, is hygroscopic and adsorbs or occludes air or moisture which in volume measurement may be as much as twice that of the coated granule. I believe that some small areas of the silicate coated granules are surrounded by the asphalt, but are not wetted thereby, and these unwetted areas, upon or in which air or moisture is occluded or otherwise contained, are the cause of the blistering tendency. The heat of the sun causes the moisture and air contained on or in these unwetted areas of the granules to be vaporized and expanded, thereby forming blisters in the asphalt. The result of this continued action is ultimately to cause the entrapped air and/or moisture to be expelled through the asphalt with the formation of eruptions. The above theory is given merely by way of explanation and is not to be taken by way of limitation.

In order to overcome the tendency towards blistering in the products of the character set forth and so that the production cost of composition roofing or siding may be materially reduced, I have developed the hereindescribed product and method of procedure.

In its broad aspect, the invention consists in a roofing or siding comprising a foundation or base with a coating of asphalt thereon, in which is partially embedded granular surfacing material. Only the exposed or unembedded portions of the granules are associated with a coloring matter bound to or united with the granules by means of a fixing agent derived from sodium silicate or the like, insolubilized by chemical treatment.

Briefly stated, this novel product may preferably be produced in the following manner. The asphalt coated base or foundation may be showered in any convenient manner with granules to be artificially colored. Thereafter the base is subjected to pressure, as by means of press rolls to cause the surfacing granules to become partially embedded in the coating layer and the surfaced face is treated with a pigmented silicate that is substantially insolubilized thereon by subsequent chemical treatment at a comparatively low temperature. Where molten asphalt is employed as the coating layer, advantage may be taken of the elevated temperature of the granules, caused by the hot asphalt, to hasten the drying of the granules and promote the insolubilization of the coloring and/or the potential fixing agent.

In the accompanying drawing, I have shown conventionally, an arrangement of apparatus for carrying out the invention in the manufacture of composition roofing or siding in which the base comprises a felted fibrous material.

In the drawing,

Figure 1 is a diagrammatic view, in elevation, of a portion of a roofing machine, showing suitable mechanism for carrying out the invention;

Figure 2 illustrates a plan view of Figure 1, with the upper portion of the sprayers broken away.

Figure 3 is an enlarged or magnified view, in cross-section, of a sheet of roofing material surfaced with mineral granules and depicting the film of artificial coloring on the exposed or unembedded portions of the granules produced in accordance with the invention.

My invention may be carried out by forming a suspension consisting of a suitable mixture of a coloring medium such as, ultramarine blue or chrome green oxide, $(Cr_2O_3)$, and a potential fixing agent or binder such as, sodium silicate having the general composition of 38 percent sodium silicate and 62 percent water. Although a wide range of sodium silicates may be employed, I have found that a sodium silicate serving my purpose contains 1 part of $Na_2O$ and 3.25 parts of $SiO_2$. The mixture of coloring medium and silicate is preferably agitated until there is a substantially uniform suspension of the coloring medium in the silicate.

In the drawing, the reference character S indicates an asphalt impregnated foundation or base of felted fibrous material, such as is customarily employed for the production of asphaltic composition roofing. This saturated or impregnated web may be coated with asphalt or other desired weatherproof coating supplied to the web through a coating feed tank 10 and the coating layer is doctored to a predetermined thickness by the doctoring rolls 11. Thereafter a surfacing layer of granules which are to be artificially colored are showered from a hopper 12 onto the asphalt coating, the granules being caused to become partially embedded in the coating by winding the surfaced web around a plurality of drums or press rolls 13. If it is desired that the product have a single or uniform color or monotone shade, the surfaced web as it passes from the last drum 13 onto the first of a plurality of loopers 14, and preferably while it is in a horizontal plane, is coated over its entire widthwise extent with a film of the prepared uniformly colored suspension which is projected onto the sheet preferably in the form of a fine atomized spray from a multicompartment sprayer 15, the nozzle 16 of which may extend the width of the sheet. Any suitable quantity of the prepared suspension may be sprayed on to the surfaced face of the web, and the rate of spray that I have found suitable for my purposes for the production of a light shade of green, consists in applying to substantially every one hundred square feet of the surfaced face, approximately two pounds of prepared suspension having the following formula by weight,

| | Parts |
|---|---|
| Commercial sodium silicate | 10 |
| Water | 5 |
| Chrome green oxide $(Cr_2O_3)$ | 1 |

Where it is desired that the product shall have a multi-color effect, each compartment of the sprayer 15 may be supplied with a differently colored suspension. These suspensions may be projected onto the sheet to provide thereon a plurality of bands of different colors.

Instead of coating the granules with a pigment carried in a suspension of the silicate, the desired color may be developed in situ as by heat treating the granules to be artificially colored after impregnation with a coloring salt. After associating the coloring medium with the granules they are embedded into the asphalt layer as heretofore described and are then coated with a uniform film of silicate and then dried.

The silicated pigmented surfaced sheet may then be fed along in festoons, as by means of loopers, 14, until the silicated pigment is sufficiently dried at the time it reaches the next stage of the process. Thereupon, the sheet may be fed, preferably while it is in a horizontal plane, beneath the sprayer 19, and then over the looper 18. The sprayer 19 extending entirely across the sheet projects an insolubilizing solution such as ammonium sulphate, aluminum chloride, or the like onto the silicated, pigmented surfaced face of the sheet.

Any suitable quantity of ammonium sulphate or aluminum chloride may be used to insolubilize the pigmented silicate, and I have found that two to five pounds of a five percent ammonium sulphate solution applied to one hundred square feet of the silicated, pigmented surfaced face accomplishes the desired result. Thereafter the web travels over the loopers 18 and is sufficiently dried before being conveyed to cutting or winding mechanism 20 for producing shingle elements or for winding into rolls.

The cutting or winding mechanism 20 is located forwardly of the festooning mechanism 18 a sufficient distance so as to afford ample time for the insolubilizing reaction and drying to take place before the cutting or winding operation is performed.

If it is found desirable to hasten the drying and to promote the insolubilizing reaction, a current of warm air ranging in temperature from about 80 to 150° F. may be passed over the sheet by means of the hot air lines 21 and 22 located forwardly of the silicate and ammonia sulphate sprayers respectively.

Although a current of air having a temperature exceeding 150° F. may be employed, the temperature is preferably controlled so that the silicate will not become intumescent.

In Figure 3 I have endeavored to show in magnified form the appearance of the finished product produced in accordance with the invention. In this figure of the drawing 30 represents the base of the material, which may, as stated, comprise a sheet of fibrous felt saturated with asphalt or like water-proofing material. The surface of the base to be exposed to the weather is provided with an asphaltic coating indicated at 31. The granules of the mineral surfacing, which are partially embedded in the coating layer, are indicated at 32. The film of artificial coloring matter produced in the manner described, is indicated by the numeral 33, and comprises the pigment and insolubilized silicate affixed to the exposed or unembedded surface areas of the granules 32.

Although I have specifically described the artificial coloring of roofing composition as it is manufactured on the conventional roofing machine, I do not wish to be limited thereby. My process has the advantage in that it lends itself to being employed not only on a roofing machine, but in the artificial coloring of granules on roofings or sidings already laid and which it is desired to color because of their faded, or other undesirable appearance.

I claim as my invention:

1. A weather resistant covering comprising a base having a bituminous coating layer on one surface thereof, mineral granules partially embedded in the coating layer, the exposed surfaces only of said granules being covered with a film comprising a coloring medium and a fixing agent for said coloring medium, said fixing agent comprising an insolubilized silicate.

2. A weather resistant covering comprising a base having a bituminous coating layer on one surface thereof, mineral granules partially embedded in the coating layer, the exposed surfaces only of said granules being covered with a film comprising a coloring medium and a fixing agent for said coloring medium, said fixing agent comprising the reaction products of a soluble silicate and an insolubilizing agent therefor.

3. A weather resistant covering comprising a base having an asphalt coating layer affixed to one surface thereof, mineral granules partially embedded in the asphalt coating layer, the exposed surfaces only of said granules carrying a film of coating which comprises a coloring medium and the reaction products of a soluble silicate and an insolubilizing agent therefor.

4. A weather resistant covering comprising a base of fibrous felt impregnated with asphalt, a layer of asphaltic coating material affixed to one surface of said base, artificially colored granules partially embedded in said asphaltic coating, and a weather resistant fixing agent for the artificial coloring covering those surfaces only of the granules which are not embedded in the asphaltic coating, said fixing agent comprising the reaction product of a soluble silicate and an insolubilizing material.

ORIN R. DOUTHETT.